United States Patent
Tidestav

(10) Patent No.: US 8,848,550 B2
(45) Date of Patent: Sep. 30, 2014

(54) CQI ADJUSTMENT FOR ARBITRARY TRANSPORT FORMAT SELECTION ALGORITHMS

(75) Inventor: Claes Tidestav, Balsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 936 days.

(21) Appl. No.: 12/676,447

(22) PCT Filed: Sep. 11, 2007

(86) PCT No.: PCT/SE2007/050641
§ 371 (c)(1),
(2), (4) Date: Mar. 4, 2010

(87) PCT Pub. No.: WO2009/035382
PCT Pub. Date: Mar. 19, 2009

(65) Prior Publication Data
US 2010/0202284 A1   Aug. 12, 2010

(51) Int. Cl.
*H04W 4/00* (2009.01)
*H04L 1/00* (2006.01)

(52) U.S. Cl.
CPC ............ *H04L 1/0009* (2013.01); *H04L 1/0026* (2013.01); *H04L 1/0018* (2013.01)
USPC .............................. 370/252; 370/255; 370/333

(58) Field of Classification Search
USPC ......... 370/216, 241, 242, 252, 253, 254, 255, 370/328, 332, 333, 400, 465, 511; 455/561
See application file for complete search history.

(56) References Cited

U.S. PATENT DOCUMENTS

| | | | |
|---|---|---|---|
| 2003/0198312 A1 | 10/2003 | Budka et al. | |
| 2004/0252647 A1* | 12/2004 | Chang et al. | 370/252 |
| 2005/0025254 A1 | 2/2005 | Awad et al. | |
| 2005/0085255 A1 | 4/2005 | Andersson et al. | |

(Continued)

FOREIGN PATENT DOCUMENTS

| | | |
|---|---|---|
| EP | 1463230 A2 | 9/2004 |
| EP | 1589715 A1 | 10/2005 |

(Continued)

OTHER PUBLICATIONS

Lentmaier, M. et al. "On the Block Error Probability of Iteratively Decoded LDPC Codes." 5th International ITG Conference on Source and Channel Coding (SCC), Jan. 14, 2004, pp. 1-13, Erlangen, Germany.

(Continued)

*Primary Examiner* — Yemane Mesfin
*Assistant Examiner* — Mon Cheri Davenport
(74) *Attorney, Agent, or Firm* — Coats and Bennett, PLLC

(57) ABSTRACT

Network node (100), mobile terminal (200), method and computer program wherein a network node (100) or a mobile terminal (200) comprise a transceiver (110, 210) which is adapted for transmitting data frames comprising data transport blocks and redundancy information, further comprising a processing unit (120, 240) receiving at least one parameter value indicative of the quality of a radio channel and at least one message indicative of an actual block error rate for the transmitted data frame, wherein the processing unit (120, 240) determines an expected block error probability for each transmitted data frame and adjusts the at least one received parameter value based on the difference between an at least one previously calculated block error probability and the actual block error rate.

20 Claims, 2 Drawing Sheets

(56) References Cited

U.S. PATENT DOCUMENTS

| | | |
|---|---|---|
| 2005/0181811 A1 | 8/2005 | Magnusson et al. |
| 2005/0250540 A1* | 11/2005 | Ishii et al. ............... 455/561 |
| 2006/0023745 A1* | 2/2006 | Koo et al. ............... 370/468 |
| 2006/0093024 A1 | 5/2006 | Pietraski et al. |
| 2006/0111100 A1 | 5/2006 | Murata et al. |

FOREIGN PATENT DOCUMENTS

| | | |
|---|---|---|
| EP | 1838003 A2 | 9/2007 |
| GB | 2433383 A | 6/2007 |
| JP | 2005057758 A | 3/2005 |
| JP | 2005318470 A | 11/2005 |
| JP | 2006157133 A | 6/2006 |
| WO | 2006068552 A1 | 6/2006 |
| WO | 2007069959 A1 | 6/2007 |
| WO | 2007/139459 A1 | 12/2007 |
| WO | 2008/025366 A1 | 3/2008 |

OTHER PUBLICATIONS

Lentmaier, M. et al. "An Analysis of the Block Error Probability Performance of Iterative Decoding." IEEE Transactions on Information Theory, vol. 51, No. 11, Nov. 2005, pp. 3834-3855 (uploaded into 2 separate files).

* cited by examiner

CQI ADJUSTMENT FOR ARBITRARY TRANSPORT FORMAT SELECTION ALGORITHMS

TECHNICAL FIELD

The present invention is related to the field of communication in wireless communication networks. More precisely it is directed to link adaptation in wireless communication networks.

BACKGROUND OF THE INVENTION

In today's mobile communication networks of the third generation called 3G-networks for short, the theoretically possible DL bitrates may reach up to 14.4 Mbit/s in so called HSDPA (High-Speed Download Packet Access) networks and in the planned 3GPP LTE (Third Generation Partnership Project Long Term Evolution) DL bitrates over 300 Mbit/s will be possible. These high bit-rates are among others achieved by adaptive signal modulation and coding techniques, where the optimal ratio between the amount of user data and redundant data is determined in order to achieve the best utilization of the resources available on the radio link.

Especially, link adaptation is used as a fundamental technique in modern mobile communication systems. With link adaptation or transport format selection, the channel coding rate and modulation scheme is chosen based on so-called CQI reports. These reports are derived at the receiver to reflect channel quality and interference levels, and subsequently transmitted over a signaling channel. CQI reports may be issued by a mobile terminal and sent to a base station or a Node B or issued by the base station or Node B and transmitted to the one or more mobile terminals. Using the received CQI reports, a transmitter selects the channel coding rate and modulation scheme to transmit as much user data as possible using as little resources as possible.

Typically, the CQI reports are accurate only for certain mobile speeds and multipath channel types. Here, the term mobile speed refers to the speed of movement of a mobile terminal in a coverage area associated with a base station or Node B. At low mobile terminal speeds, i.e. up to 1 m/s the transmission conditions will be changing slowly and signal fading will be slow as well. Thus, CQI reports sent from the moving mobile terminal to the base station will approximately reflect the real transmission conditions on the radio channel.

In other situations the CQI reports are inaccurate to some extent. For example, for a mobile terminal moving at higher speeds, such as at 10 m/s or faster, the channel conditions will be changing fast due to fast signal fading. Thus the CQI-reports transmitted to a base station at one instant will most probably not reflect the real channel conditions once they are received at the base station. This means that the link adaptation also becomes inaccurate, causing the quality predicted at the transport format selection to differ from the quality at the time of the reception. One way of compensating for such inaccuracies that has been devised in known technology is a function called CQI adjustment. This function effectively constitutes an outer loop for the link adaptation. With CQI adjustment, the received quality is compared to a quality target. In case the reported signal quality differs from the quality target, the reported CQI is adjusted by a corresponding value.

However, in existing solutions, the CQI adjustment relies heavily on that the transport formats and transmit power are chosen to obtain a certain target BLER. In case other quality targets are desirable, the BLER target method may not lead to an optimum solution and possibly cause unpredictable behavior for the transmission and reception of data. Deviations from the BLER target will in this case be caused not only by inaccurate CQI reports but more commonly by selection of transport format.

SUMMARY OF THE INVENTION

These and other problems associated with known technology are, at least in part, overcome by the present invention.

More specifically, at least some of the above mentioned problems are solved by a network node for communication in a wireless communication network a transceiver adapted for transmitting data frames which comprise data transport blocks and redundancy information;

a processing unit adapted for receiving at least one parameter value indicative of the quality of a radio channel and at least one message indicative of an actual block error rate for the transmitted data frame, where the processing unit is further adapted for determining an expected block error probability for each transmitted data frame, wherein the processing unit is further adapted for adjusting the at least one received parameter value based on the difference between an at least one previously calculated block error probability and the actual block error rate.

Thus, in the solution proposed above, the block error rate may vary depending on the choice of the data frame structure leading to more optimized data frame formats for different applications as well as to more accurate information on the actual channel conditions on the downlink.

Hence in applications where achieving a certain block error rate is not the main target the network node according to the present invention may yield higher bit-rates, user throughput, shorter packet delay times and other advantages.

According to another aspect of the present invention the problems associated with known technology are, at least in part, solved by a mobile terminal for communication in a wireless communication network, where the mobile terminal comprises:

a transceiver adapted for transmitting data frames which, in turn, comprise data transport blocks and redundancy information;

a processing unit adapted for receiving at least one parameter value indicative of the quality of a radio channel and at least one message indicative of an actual block error rate for the transmitted data frame, where the processing unit is further adapted for determining an expected block error probability for the transmitted data frame and where the processing unit is further adapted for adjusting the at least one received parameter value based on the difference between an at least one previously calculated block error rate and the actual block error rate.

The same advantages mentioned for the network node according to the present invention apply to the mobile terminal according to the present invention.

According to yet another aspect of the present invention, the problems related to known technology are, at least in part, solved by a method for communication in a wireless communication network where the method comprises the steps of:

a) receiving at least one parameter value indicative of the quality of a radio channel;

b) adjusting the at least one parameter value by a correction value;

c) selecting a data frame structure comprising transport blocks and redundancy information based on an achievable signal quality associated with the adjusted parameter value.

d) transmitting the selected data frame structure;

e) receiving a message indicative of an actual block error rate for the transmitted data frame structure, whereby the correction value is obtained from a comparison between previously calculated block error rates associated with previously selected data frame structures and the actual block error rate.

It should be mentioned here, that the method according to the present invention is especially suited to be implemented by a network node or a mobile terminal according to the present invention.

Further, according to yet another embodiment of the present invention, at least some of the disadvantages of known technology are overcome by a computer program for communication in a wireless communication network comprising instruction sets for:

receiving at least one parameter value indicative of the quality of a radio channel;

adjusting the at least one parameter value by a correction value;

selecting a data frame structure comprising transport blocks and redundancy information based on an achievable signal quality associated with the adjusted parameter value;

transmitting the selected data frame structure;

receiving a message indicative of an actual block error rate for the transmitted data frame structure, where the computer program comprises a further instruction set adapted for obtaining the correction value from a comparison between previously calculated block error rates associated with previously selected data frame structures and the actual block error rate.

It may be remarked that the computer program according to the present invention is especially suited for executing the method steps of the method according to the present invention. Additionally, the computer program is also suited to be stored in the network node or the mobile terminal (or both) from where it may execute the method steps of the method according to the present invention.

These and other advantages will be more apparent from reading the following detailed description together with the accompanying drawings.

DETAILED DESCRIPTION OF PREFERRED EMBODIMENTS

Figure 1:
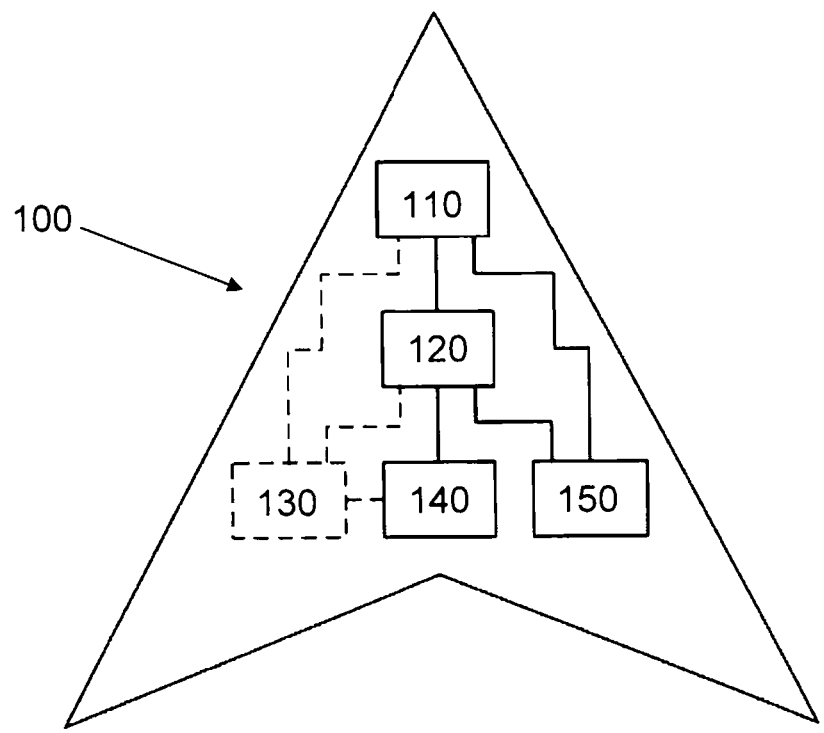
FIG. 1 illustrates a base station according to one embodiment of the present invention.

Turning now to FIG. 1, a base station 100 according to one embodiment of the present invention is shown. The term base station should be interpreted as comprising network nodes such as a BST (Base Station Transceiver), Node B, APs (Access Points) and other network nodes performing the role of an access point to which mobile terminals may connect.

Even though the following description focuses on the embodiment of a base station in a 3G mobile communication network, the present invention is by no means limited to mobile networks only. In fact the, the present invention may be employed in any wireless communication network comprising at least one base station, where user data is sent in data blocks and where the transport format is dependent on radio channel conditions and available transmit power.

Returning now to FIG. 1, the base station 100 comprises, aside from the transceiver 110, also a processing unit 120, a memory 140 and a control unit 150. Optionally, the base station 100 may also comprise a measurement unit 130.

The processing unit 120 is adapted to select the optimum transport format for the user data. Here, the term optimum transport format refers to a optimum transport format according to a predefined criterion, which may be, for example, highest instantaneous throughput, greatest length of data block or the shortest delay in arrival time and other possible criteria. Thus, compared to known technology where only a target BLER affects the choice of transport format, here, the choice of transport format is aimed at satisfying a different criterion. This may in fact alter the target BLER value.

Additionally, the processing unit 120 may, when selecting the transport format also take the available transmit power on the radio channel into consideration. However, there may be cases where the reported CQI in reality does not reflect the actual conditions on the downlink. Simply using the reported CQI value may therefore lead to wrong selection of transport format and possibly even higher a higher error rate for the transport format selected. Therefore, the processing unit 120 is adapted to perform a correction of the received CQI value by, for example, adding a correction value to the reported CQI obtained from comparisons between the BLEP (Block Error Rate Probability) from previous selections of suitable transport format and the actual BLER experienced at the receiver. This will be elaborated further down in the text.

Now, using the possibly corrected CQI value, the processing unit 120 is adapted to map the SINR to BLEP for every transport format. This mapping from SINR to BLEP may be determined from radio link simulations and already stored as numeric values in a table in the memory 140 of the base station 100.

Furthermore, the processing unit 120 is adapted to choose a modulation and coding scheme best suitable for the current transmission conditions on the radio link and to add redundancy information to the data frame carrying user data.

Now, the control unit 150 is adapted to receive the transport block plus the redundancy data and to add signalling bits to the transport block indicating the modulation and coding scheme and the number of redundant bits before the processing unit 120 transmits the data frame to a receiver via the transceiver 110.

The optional measurement unit 130 indicated by dashed lines has the function of measuring parameters indicative of the channel quality on the uplink and forwarding these measured parameter values to the processing unit 120. Also, the measurement unit 130 may store the measured parameter values in the memory 140 of the base station 100. Using the measured parameter values, the processing unit 120 is adapted to calculate a so called CQI (Channel Quality Indicator) and to transmit the CQI value via the transceiver 110 to one or more mobile terminals.

Additionally, the optional measurement unit 130 may from data received from one or more mobile terminals measure parameters indicative of the channel quality on the uplink. Assuming that the conditions on the uplink are similar to those on the downlink, the processing unit 120 may also use the measured parameter values received from the measurement unit 130 to calculate a channel quality and use it as a channel quality indicator when selecting the suitable transport format for the downlink transmissions. Using this arrangement the base station would not need CQI reports from mobile terminals. Thus, upstream control signalling may be reduced.

Figure 2:
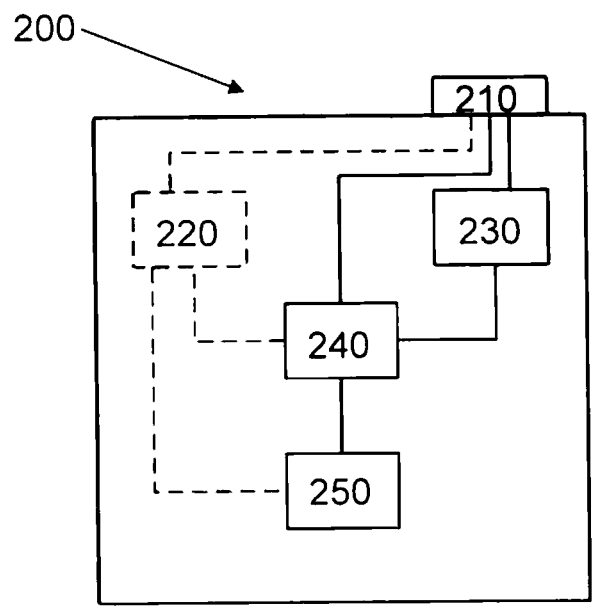
FIG. 2 illustrates a mobile terminal according to one embodiment of the present invention.

FIG. 2 represents a mobile terminal 200 according to one embodiment of the present invention. Here, a mobile terminal is to be understood to comprise all mobile devices suitable for communication in a wireless communication network. Some examples of a mobile terminal are cell phones, smart phones, PDAs, laptops and other mobile terminals. The mobile terminal 200 according to the embodiment in FIG. 2 comprises a transceiver 210, a control unit 230, a processing unit 240 and a memory 250.

Via the transceiver 210, the mobile terminal is adapted to receive a measured parameter value indicative of the transmission conditions of the uplink channel. In this example, the measured parameter may be a CQI (Channel Quality Indicator) as mentioned before. By means of the CQI, the mobile terminal 200 may besides the channel quality also obtain information about the interference on the uplink channel. From the perspective of a mobile terminal, this CQI value is transmitted from a base station in whose coverage area or cell the mobile terminal 200 is located to the mobile terminal 200.

Worth mentioning here is also the fact that the processing unit 240 of the mobile terminal 200, similarly to the processing unit 120 in the base station 100 in FIG. 1, may adjust the received CQI value by a correction value obtained from comparisons of an estimated BLEP derived from past choices of transport format with the actual BLER experienced at the receiver. The processing unit 240 is adapted to perform these comparisons in much the same way as the processing unit 140 of the base station 100 in FIG. 1

Now the processing unit 240 is adapted to estimate the achievable SINR (Signal-to-Interference plus Noise Ratio) from the received and possible adjusted CQI value and the available transmit power. Also, other parameters indicative of the achievable signal quality may be used, such as SIR (Signal-to-Interference Ratio), CIR (Channel Interference Ratio).

Depending on the calculated SINR, the processing unit 240 may choose a robust transport or a less robust transport format for user data in the next transmission. In other words, the processing unit 220 may in the case of high SINR (in mobile communication networks>15 dB) choose a transport format where the number of user data bits is much higher than the number of redundancy bits.

However, in case the calculated SINR is low (in mobile communication networks<5 dB) the processing unit 240 may choose a transport format with a larger amount of data bits carrying redundant information compared to the amount of bits carrying user data.

It should be borne in mind though, that there is a trade-off between the size of the transport block (the number of user data bits) and the achievable BLEP (Block-Error Rate) at the receiver which in this case is a base station. Larger transport blocks may lead to higher BLEP values while transferring more user data, whereas smaller transport blocks achieve a lower BLEP at the cost of transmitting less user data.

In order to obtain a relationship between the calculated SINR and the achievable BLEP for different transport block sizes, the processing unit 240 may utilize link simulation data stored in the memory 250 of the network node. Preferably, the memory 250 should be an internal ROM (Read Only Memory), but the mapping between SNIR values and the achievable BLEP may also be stored on a FlashROM, a hard disk, a memory card or some other data storage unit. There are many ways the processing unit 240 may select an optimum transport block size reaching a certain BLEP after having determined the maximum transmit power available. Some of these ways are described more in detail in FIG. 3.

Using the available transmit power, the processing unit 240 is adapted to determine the achievable SINR. Moreover, using SINR to BLEP mapping data, the processing unit 240 is adapted to choose the optimum transport block size. It should be mentioned here that optimum transport block sizes may differ depending on the optimization goal. One optimization may aim at choosing the largest transport block (the largest amount of user data) possible using the available transmit power determined from a received and possibly adjusted CQI value. This may lead to a new BLER target which the mobile terminal should achieve.

One other optimization goal may be to choose the transport block with the largest instantaneous throughput. Even in this case, the choice of a transport block size will affect the BLEP at the receiver and will therefore necessitate calculation of a new BLER target. One other optimization goal may be the reduction of the delay in arrival time between consecutive transport blocks. Especially in VoIP applications, delay is a critical parameter. After having chosen the optimum transport block size, the processing unit 240 is also adapted to instruct the control unit 230 to adjust the transmit power to the available transmit power and to signal information about the transport block indicating, among other things, the modulation and coding format, the size of the transport block and the number of bits carrying redundant information. This may be done either in a data frame sent to the receiver or on a separate control channel, as preferred. Here, a data frame is to be understood as a data structure comprising data and redundancy bits and optionally signalling bits indicative of the modulation and coding scheme as well as the number of redundancy bits. This data structure comprises a certain length both in the number of bits transmitted and the time domain.

Returning to FIG. 2, the processing 240 unit may transmit the transport block via the transceiver 210 to the base station or some other receiver.

Optionally, the mobile terminal 200 may also be equipped with a measurement unit illustrated by the dashed box 220 in FIG. 2. Its connection to other units in the mobile terminal 200 are also shown by dashed lines.

Essentially, the function of the measurement unit 220 is to measure signal quality values from data received from the base station in the wireless network indicative of the channel quality on the downlink. These measurement values are then reported via the transceiver 210 to a base station. However, it may be equally possible for the measurement unit 220 to determine the signal quality for the received signal and to forward this value to the processing unit 240 of the mobile terminal 200 which may decide on the available transmit power. Here, it is then assumed than the channel conditions on the uplink are essentially equal to the channel conditions on the downlink reported by the measurement unit 220. Measuring the signal quality directly at the base station may in some case have the additional advantage of obtaining a more accurate information on the channel conditions on the downlink, since the measurement results are obtained earlier than in the case of receiving CQI reports from a mobile terminal. However, this would presuppose essentially identical conditions on the downlink and the uplink.

Figure 3:
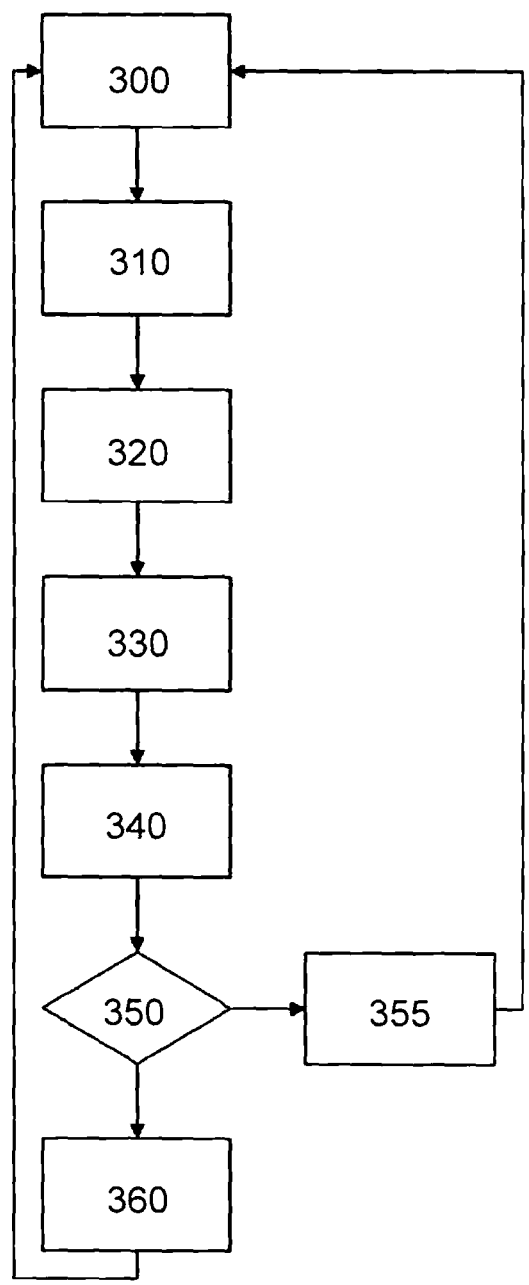
FIG. 3 shows the steps of a method according to one embodiment of the present invention.

Turning now to FIG. 3, a detailed description of one embodiment of a method according to the present invention is given. Here, the method steps are described from the perspective of a base station. However, these steps may equally be implemented in a mobile terminal.

At step 300, a processing unit of the base station, such as the processing unit 120, receives a parameter value indicative of the channel conditions on an uplink signalling channel from a mobile terminal it intends to send data to. The type of the parameter value may differ from one wireless network to the other. In this example embodiment, we choose this parameter value to be the CQI (Channel Quality Indicator).

Next, at step 310, the processing unit of the base station retrieves a correction value from the memory of the base station and adds it to the received CQI. At the first execution loop of the embodiment from FIG. 3 of the method according to the present invention this correction value may be chosen to be zero.

The processing unit then calculates the obtainable SINR value from the corrected CQI value and the available transmit power.

Thereafter, at step 320, the processing unit may from this estimated SINR value choose the transport format yielding the highest instantaneous throughput from a table stored in the memory of the base station, such as the memory 240.

Even though the remaining part of the description of the method in FIG. 3 will focus on selecting the transport format yielding the largest instantaneous throughput, it should be borne in mind that there may be other possible optimization aims at step 320. The steps following step 320 of the embodiment of a method according to the present invention will be essentially the same in these cases.

For example, the processing unit may choose the largest transport block size from the estimated SINR. This may be useful if the aim is to send as much data as possible during one transmission.

Yet another possibility for the processing unit may be to select a transport format yielding the smallest delay in arrival time at a receiver. Especially in VoIP applications the perceived delay in arrival time for a data frame is critical.

As a further possibility, the processing unit may already at step 320 detect the type of data to be sent to a receiver and adjust the optimization aim thereafter, i.e. selecting the transport block yielding the highest throughput or choosing the largest transport block size or minimizing the delay in arrival time or some other parameter.

In this embodiment, the transport format may comprise user data which may be modulated and coded according to a certain modulation and coding scheme and redundancy bits for user data recovery in case of erroneously received user data at the receiver. In other wireless communication systems, the transport format may have a different structure, but the present invention may be applied in these systems as well as long as the transport format comprises at least user data and redundancy data for data recovery.

Now, the throughput in this example depends on parameters such as transport block size (the number of user data bits), modulation and coding scheme.

The size of the transport block will also affect the BLEP (Block-Error Rate). Larger transport block sizes will affect the expected BLEP negatively, since the transport format will involve less redundancy bits (keeping in mind that the length of the data frame is constant), but will increase the instantaneous throughput. On the other hand, smaller transport block sizes will yield less data throughput, but will be more robust against transmission errors due to the increased number of redundancy bits in the in the data frame.

One other alternative (not shown) to table lookups for the mapping between achievable SINR and resulting BLEP stored in the memory of the base station may be to let the processing unit compare the achievable SINR to SINR threshold values for low, intermediate and high SINR and from the comparisons choose the transport format resulting in the largest instantaneous throughput. This would necessarily entail choosing less robust transport formats if the achievable SINR is higher than an upper SINR threshold and more robust transport formats if the achievable SINR is lower than a lower SINR threshold.

In the next step, at 330, the data frame with the transport format selected in 320 is transmitted and the control unit is instructed to signal the modulation and coding scheme and the number of redundancy bits in the data frame. Depending on the implementation, the signalling bits may be added by the control unit to the data frame or signalled separately, as desired.

Subsequently, at step 340, the processing unit calculates the expected BLEP (Block Error Probability) from the chosen transport block size. Using the calculated BLEP the processing unit estimates a new BLER target, which may be different from the nominal BLER target (in mobile communication networks about 10%).

In this embodiment of the method of the present invention, the processing unit at step 340 calculates a new BLER target by determining an average of the BLEP values of the previously selected past transport formats and compares it to an actual BLER at the receiver. Usually, the actual BLER may be readily determined from ACK/NACK messages received from the mobile terminal. The ratio of the erroneously received transport blocks and the correctly received transport blocks will yield the actual BLER experienced by the receiver. It should also be pointed out that there are other possible ways to determine a new BLER target aside from the average value of the BLEP parameter. For example, one might take a weighted average of the BLEP favouring those measurements when the largest transport blocks have been sent to the receiver.

Now, at step 350, the processing unit compares the new BLER target to the actual BLER target experienced at the receiver. One simple way of comparing the two values is to calculate the difference between them.

If at step 350, the processing unit determines that the new BLER target is not equal to the actual BLER at the receiver, i.e. that the difference between the new BLER target and the actual BLER is not equal to zero, this is an indication that the CQI received from the mobile terminal is not correct.

If at step 350, the processing unit of the base station determines that the difference is negative, this is an indication that the actual channel quality is in reality lower than the channel quality reported in the CQI, even with the correction applied in step 310. Thus, the processing unit calculates from the difference a new negative correction value for the CQI received at step 355 and stores the correction value in the memory, such as the memory 140 in the base station 100 in FIG. 1.

Thereafter, the method returns to step 300 where the processing unit of the base station receives a new CQI value.

If, on the other hand, the difference between the new target BLER and the actual BLER is positive, this is an indication that the actual channel quality is higher than the channel quality reported in the CQI, even with the correction applied in step 310. In this case, the processing unit calculates at step 360 a new positive correction value for the CQI from the difference between the calculated target BLER and the BLER experienced at the receiver and stores it in the memory of the base station.

However, if at step 350 the processing unit of the base station determines that the difference between the new BLER target and the actual BLER target is zero, this is an indication that the CQI reports corrected with the correction in step 310 accurately reflects the channel quality. In this case, the processing unit leaves the correction value for the received CQI unchanged and returns to step 300 where the processing unit receives another CQI value.

After step 360, the method returns to step 300 where the processing unit receives a new CQI value.

Finally, it should be remarked that the present invention is not limited by the example embodiments described earlier and that skilled persons having studied the earlier description will be aware of other possible embodiments of the present invention. Therefore, the scope of the present invention is only limited by the accompanying claims.

The invention claimed is:

1. A network node for communication in a wireless communication network, said network node comprising:
 a processing unit configured to receive at least one parameter value indicative of the quality of a radio channel, adjust the at least one parameter value by a correction value, and select a data frame structure comprising transport blocks and redundancy information based on an achievable signal quality associated with the adjusted parameter value; and
 a transceiver configured to transmit the selected data frame structure;
 wherein said processing unit is further configured to receive a message indicative of an actual block error rate for the transmitted data frame structure, and to select the data frame structure based on determining an expected block error probability for each transmitted data frame, estimating a new Block Error Rate target using the expected block error probability, and adjusting the at least one received parameter value based on the difference between the new Block Error Rate target and the actual block error rate.

2. The network node according to claim 1, wherein the network node additionally comprises a memory configured to store the at least one received parameter value.

3. The network node according to claim 1, wherein the network node additionally comprises a measurement unit configured to measure the parameter value indicative of the quality of the radio channel.

4. The network node according to claim 3, wherein the measurement unit is configured to forward the determined parameter value to the processing unit.

5. The network node according to claim 1, wherein the network node additionally comprises a control unit configured to control the transmit power and to signal the amount of redundancy information in a data frame.

6. The network node according to claim 1, wherein the processing unit is configured to select the size of a data transport block in the data frame in order to fulfill a predefined criterion.

7. The network node according to claim 6, wherein the processing unit is configured to select the size of a subsequent data transport block fulfilling the predefined criterion based on the adjusted parameter value.

8. The network node according to claim 6, wherein the predefined criterion comprises one of the following parameters: maximum throughput, largest transport block size, or delay in arrival time.

9. The network node according to claim 1, wherein the processing unit is configured to determine the actual block error rate from the number of incorrectly and correctly received data transport blocks reported in an acknowledged/not acknowledged (ACK/NACK) message.

10. The network node according to claim 1, wherein the processing unit is configured to estimate a block error probability for the transport block selected and to calculate a new block error rate value by determining the average value of the block error probability over a predefined number of data frame transmissions.

11. The network node according to claim 1, wherein the network node comprises a base station, a Node B, an access point, or a radio network controller.

12. The network node according to claim 1, wherein a control unit of the network node is configured to signal the amount of redundancy information in the data frame selected on a separate control channel.

13. The network node according to claim 1, wherein a control unit of the network node is configured to signal the amount of redundancy information in the data frame inside the data frame.

14. The network node according to claim 1, wherein the processing unit is configured to estimate the block error probability associated with the transport block size selected and to calculate the corresponding block error rate by determining the average of the estimated block error probabilities over a predefined number of data frame transmissions.

15. The network node according to claim 1, wherein the at least one received parameter value comprises a Channel Quality Indicator (CQI) value.

16. A mobile terminal for communication in a wireless communication network, said mobile terminal comprising:
 a processing unit configured to receive at least one parameter value indicative of the quality of a radio channel, adjust the at least one parameter value by a correction value, and select a data frame structure comprising transport blocks and redundancy information based on an achievable signal quality associated with the adjusted parameter value; and
 a transceiver configured to transmit the selected data frame structure;
 wherein the processing unit is further configured to receive a message indicative of an actual block error rate for the transmitted data frame structure and to select the data frame structure based on determining an expected block error probability for each transmitted data frame, estimating a new Block Error Rate target using the expected block error probability, and adjusting the at least one received parameter value based on the difference between the new Block Error Rate target and the actual block error rate.

17. A method for communication in a wireless communication network, said method comprising the steps of
 a) receiving at least one parameter value indicative of the quality of a radio channel;
 b) adjusting the at least one parameter value by a correction value;
 c) selecting a data frame structure comprising transport blocks and redundancy information based on an achievable signal quality associated with the adjusted parameter value;
 d) transmitting the selected data frame structure;
 e) receiving a message indicative of an actual block error rate for the transmitted data frame structure; and
 wherein step c) includes: determining an expected block error probability for each transmitted data frame, estimating a new Block Error Rate target using the block error probability, and adjusting the at least one received parameter value based on the difference between the new Block Error Rate target and the actual block error rate.

18. The method according to claim 17, wherein the data frame structure in step c) is additionally selected based on a predefined criterion.

19. The method according to claim 18, wherein the predefined criterion comprises one of the parameters: throughput, largest transport block size fulfilling a predefined block error rate target, and delay in arrival time.

20. A computer program stored in a non-transitory computer readable medium, said computer program for communication in a wireless communication network and comprising instruction sets including instructions for:
  receiving at least one parameter value indicative of the quality of a radio channel adjusting the at least one parameter value by a correction value;
  selecting a data frame structure comprising transport blocks and redundancy information based on an achievable signal quality associated with the adjusted parameter value;
  transmitting the selected data frame structure• receiving a message indicative of an actual block error rate for the transmitted data frame structure; and
  determining an expected block error probability for each transmitted data frame, estimating a new Block Error Rate target using the block error probability, and adjusting the at least one received parameter value based on the difference between the new Block Error Rate target and the actual block error rate.

* * * * *

UNITED STATES PATENT AND TRADEMARK OFFICE
CERTIFICATE OF CORRECTION

PATENT NO. : 8,848,550 B2  
APPLICATION NO. : 12/676447  
DATED : September 30, 2014  
INVENTOR(S) : Tidestav Page 1 of 1

It is certified that error appears in the above-identified patent and that said Letters Patent is hereby corrected as shown below:

On the Title Page, in Item (75), under "Inventor", in Column 1, Line 1, delete "Balsta" and insert -- Bålsta --, therefor.

In the Specification

In Column 1, Line 48, delete "situations" and insert -- situations, --, therefor.

In Column 5, Line 1, delete "arrangement" and insert -- arrangement, --, therefor.

In Column 5, Lines 31-32, delete "unit 140 of the base station 100 in FIG. 1" and insert -- unit 120 of the base station 100 in FIG. 1. --, therefor.

In Column 5, Line 42, delete "unit 220" and insert -- unit 240 --, therefor.

In Column 7, Line 20, delete "memory 240." and insert -- memory 250. --, therefor.

In the Claims

In Column 11, Line 19, in Claim 20, delete "structure• receiving" and insert -- structure receiving --, therefor.

Signed and Sealed this  
Second Day of June, 2015

Michelle K. Lee  
*Director of the United States Patent and Trademark Office*